Figure 1:
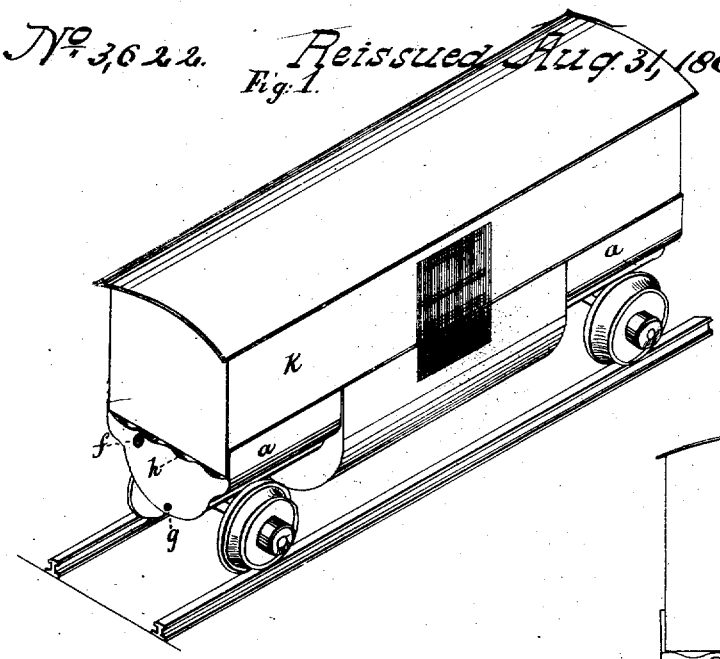
Figure 3:
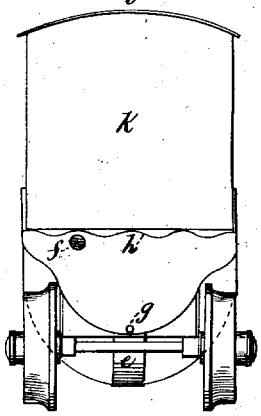
Figure 2:
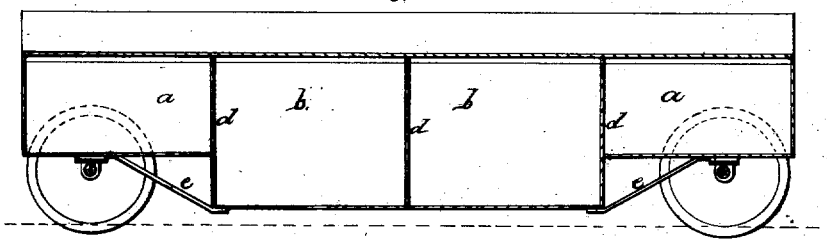
Figure 4:
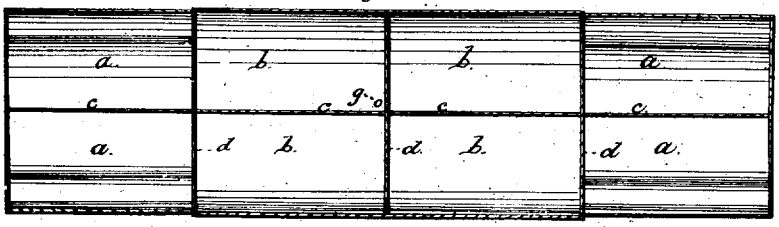

J. F. Keeler.
Oil & Paint Vessels.

No. 3,622. Reissued Aug. 31, 1869.

Witnesses.
Samuel Graham.
Frank W. Kennedy.

Inventor.
J. F. Keeler

UNITED STATES PATENT OFFICE.

JOEL F. KEELER, OF PITTSBURG, PENNSYLVANIA.

IMPROVEMENT IN RAILROAD-CARS FOR TRANSPORTING PETROLEUM.

Specification forming part of Letters Patent No. 45,831, dated January 10, 1865; Reissue No. 2,031, dated July 18, 1865; Reissue No. 3,622, dated August 31, 1869.

*To all whom it may concern:*

Be it known that I, JOEL F. KEELER, of the city of Pittsburg, county of Allegheny, and State of Pennsylvania, have invented a new and Improved Mode of Constructing Railroad-Cars, better adapting them for the safe transportation of liquids in bulk, as well as for dry freight and passengers, than has hitherto been known and used; and I do declare that the following is a full, clear, and exact description of my invention, reference being had to the accompanying drawings, and to the letters of reference marked thereon, like letters referring to like parts, in which—

Figure I is a perspective of my car constructed as a two-storied car. Fig. II is a longitudinal vertical section of the lower part or tank. Fig. III is an exterior end view of my two-storied car. Fig. IV is a horizontal longitudinal section through the lower part or tank.

The nature of my invention consists—

First. In providing a railway-car with a laterally curved, bent, or depressed metal bottom, and, when desirable for use in carrying liquid freight or for other purposes, with metallic sides and tops, forming thereby at will a closed metal tank, and, therefore, fire-proof.

Second. When desirable, I place over such bent, curved, or depressed metallic bottom, at such height as I desire, such a frame-work, K, of wood, metal, or other known substances, of any known form and construction as will adapt it for use as a railway-car for any known purpose.

Third. When I choose, I construct, at any desirable distance above the bottom, a horizontal partition, *h*, which serves as a ceiling or cover for the part below it, and as a floor for the part above it. In this floor I make such holes or openings as I deem proper, and provide them with suitable covers, thus making a two-storied car, with both stories covered in from the weather, but accessible to and from each other. When desirable, the lower story is divided into compartments, as shown at *c c* and *d d*, and each compartment provided with holes or hatches, at will.

Fourth. When desirable, that part of the bottom between the fore and hind axles, or the fore and hind trucks, as the case may be, is made to drop lower than the parts over the axles or the trucks, as seen at *b b b b*, and the contents, when liquid, are drawn off from this lowest part, and consequently are entirely drawn off.

Fifth. As the entire invention shows, I dispense in the drawings and specifications with the usual frame-work denominated the "platform" of the car, making the curved or depressed metal-plate bottom *a a* and *b b* subserve the same purposes as the frame-work heretofore used, by putting the supports for the axles and their journal-boxes, or the center-plates for the trucks, as the case may be, directly onto the said depressed metal-plate bottom, as seen in Figs. II and III.

Sixth. When the car is constructed for carrying liquids in bulk, it is provided with openings on the top, as seen at *f f*, Figs. I and III, for filling the tank, and with other openings, as at *g g*, for emptying. (See Figs. I, III, and IV.) These openings or holes are closed and opened by means of any known device, and operated in any known way; but, in order to save the time, labor, and expense of pumping off the contents near the bottom of the tank, (as was done before the invention of my car,) or the bad practice, sometimes enacted, of hauling such contents back and forth, I place the draw-off apparatus of my car at the lowest part of the tank, either in the side of a part made, like *b b*, to drop below the general bottom or through some part of the bottom itself, as seen at *g*, Fig. IV, thus permitting the contents of the tank to flow entirely out by their own gravity. The draw-bars and the bunters are of any known construction, and are attached to the ends of the tank in any known way, whereby the curved bottom is made to serve as the frame-work of the car.

To enable others skilled in the art to make and use my invention, I will proceed to further describe its construction and operation.

I make my car of any known form, size, and shape, with the usual appendages of a railway-car attached thereto, and of any known materials, except that I make the bottom of the car of plate iron, steel, or other metal, and of a thickness corresponding with the size and strength desired in the car, but usually from one-eighth to one-fourth inch in thickness. I curve or bend this plate metal, whether in sections or in a single piece, in a lateral direction by any given angles or curves and to any known form or shape, turning the external or convexed side downward in making up the car, thus making the entire bottom of the car laterally like a species of inverted arch in its general shape or conformation, as shown in Figs. I and III, so that when resting on its center-plates on trucks, as it is usually made, the bottom braces laterally, and, by this same bending or curving, is rendered a very firm truss for the superstructure that may be built and for the load that may be placed upon it. I usually support the places or points on the bottom where it rests on the axles or on the trucks, as the case may be, by an additional thickness of metal, either in the original plate or by additional pieces put on. I also attach side bearings of any known construction, and also "center-plates," so called, which I prefer to make broad, using the side bearings but little, except in emergencies of great rolling or twisting of the trucks, and carrying the entire weight usually on the center-plates. I pass king-bolts or center-pins into or through these center-plates, and fasten them therein in any known way. I place the car-body either on trucks or on wheels and axles of any known construction and in any known way.

When I desire to construct the car for carrying liquids, I carry up the sides of the curved metal bottom with additional plates of metal until the desired capacity is attained. I then cover it over with such a cover as I prefer of any fire-proof material known, usually of metal, so as to render it a close metallic tank, providing it with man-holes, fill-holes, &c., at the top, and such draw-off holes at the bottom (provided with stoppers, plugs, and cocks of any known construction) as that the entire contents of the tanks may be draw off by their own gravity, without either pump or siphon. This is one of the distinguishing features of my car, as previous to its invention all cars for carrying liquids in bulk had their draw-off devices put into the sides of their tanks, instead of through their bottoms, and so far above their bottoms as to leave large quantities of the liquid in the tanks (especially when of considerable size) that could not run out, and therefore had either to be hauled back and forth necessarily or be pumped out at considerable trouble and expense.

When I construct the car for carrying dry freight or passengers, I place over the curved bottom (carried up to such height as I choose) and attach thereto a frame for a car, of any materials, size, shape, or construction known, and provided with such doors, windows, or other appurtenances as belong to freight or passenger cars. If intended for both liquid and dry freight or passengers at the same time, or for liquid freight in one direction and dry freight in the other, then I calk the lower part; but if I use the lower part also for dry freight, as I sometimes do, and the upper for either dry freight or passengers, then calking is not needed at the bottom.

Prior to the invention of my car all cars for the carrying of liquids in bulk had tanks, which were placed on wooden platforms that constituted the frame-work of the cars, and at a considerable height above those platforms, which arrangement required the tanks to be made of great length, and consequently of great weight; or else, if made compact and of sufficient size to carry a fair load—say one hundred barrels of petroleum—the car would be rendered top-heavy and liable to upset. It would also strain the rails of the road and the structure of the cars. Now, in order to obviate these difficulties and dangers, I make my car in such a manner that the tank for holding the liquid lies down as low as the tops of the wheels, or, if desired, as low as to the axles, placing my draw-bars and bunters at the usual height for connection with other cars.

Railway tank-cars are, practically, confined to the carrying of petroleum and its products—an article so inflammable in its nature as almost to defy the ingenuity of man for the preservation either of itself or of its surroundings from devastating conflagrations. In order to prevent these dangers from fire as far as practicable, I have constructed my car in such a manner that all its important or material parts, including the connections that hold the running-gear together, are incombustible. In other words, I have made it fire-proof.

Not limiting myself to the precise description herein set forth, but claiming the use of any known device or material of like functions, what I claim as my invention, and desire to secure by Letters Patent, is—

1. The construction of a fire-proof railway tank freight-car, substantially as described.
2. The construction of railway tank freight-cars in such a manner that the tank constitutes, substantially, the frame-work of the car.
3. The construction of tank freight-cars in such a manner that their tanks or some parts thereof are carried as low as the tops of the car-wheels, substantially as described.
4. A metallic inverted-arch truss or bottom in the construction of railway-cars, substantially as described.
5. The construction of railway-cars having two inclosed stories, substantially as described.
6. The construction of railway tank-cars, with tanks having a depression in their bottoms through which their contents are drawn off, substantially as described.

JOEL F. KEELER.

Witnesses:
M. D. EDWARDS,
AND. HUMBERT,
FRANK BUSHNELL.